US011563638B1

United States Patent
Jayaramachar et al.

(10) Patent No.: US 11,563,638 B1
(45) Date of Patent: Jan. 24, 2023

(54) METHODS, SYSTEMS, AND COMPUTER READABLE MEDIA FOR OPTIMIZING NETWORK BANDWIDTH UTILIZATION THROUGH INTELLIGENT UPDATING OF NETWORK FUNCTION (NF) PROFILES WITH NF REPOSITORY FUNCTION

(71) Applicant: Oracle International Corporation, Redwood Shores, CA (US)

(72) Inventors: Amarnath Jayaramachar, Bangalore (IN); Jay Rajput, Bangalore (IN); Virendra Singh, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/460,149

(22) Filed: Aug. 27, 2021

(51) Int. Cl.
| | |
|---|---|
| *H04L 41/0896* | (2022.01) |
| *H04L 41/0816* | (2022.01) |
| *H04L 41/06* | (2022.01) |
| *H04L 43/0876* | (2022.01) |
| *H04L 43/10* | (2022.01) |
| *G06N 5/02* | (2006.01) |

(52) U.S. Cl.
CPC .......... *H04L 41/0896* (2013.01); *H04L 41/06* (2013.01); *H04L 41/0816* (2013.01); *H04L 43/0876* (2013.01); *H04L 43/10* (2013.01); *G06N 5/02* (2013.01)

(58) Field of Classification Search
None
See application file for complete search history.

(56) References Cited

U.S. PATENT DOCUMENTS

| | | |
|---|---|---|
| 6,725,278 B1 | 4/2004 | Gonzalez |
| 7,151,945 B2 | 12/2006 | Myles et al. |
| 7,706,822 B2 | 4/2010 | Emeott et al. |
| 8,306,034 B2 | 11/2012 | Jang et al. |

(Continued)

FOREIGN PATENT DOCUMENTS

| | | | |
|---|---|---|---|
| WO | WO 2022083867 | * | 4/2022 |
| WO | WO-2022083867 A1 | * | 4/2022 |

OTHER PUBLICATIONS

3GPP et a. 3GPP TS 29.510 Va1.3.0. 3rd Generation Partnership Project; Technical Specification Group Core Network and Terminals; 5G System; Network Function Repository Services; (Year: 2021).*

(Continued)

*Primary Examiner* — Younes Naji
(74) *Attorney, Agent, or Firm* — Jenkins, Wilson, Taylor & Hunt, P.A.

(57) ABSTRACT

A method for optimizing network bandwidth utilization through intelligent updating of network function (NF) profiles includes, at an NF repository function (NRF), receiving, from a first NF that previously communicated with a failed geo-redundant mate of the NRF as primary, an NF heart-beat request message. The method further includes locating an NF profile for the first NF in an NF profiles database maintained by the NRF. The method further includes computing an NF profile data modification detection value for the NF profile. The method further includes transmitting the NF profile data modification detection value to the first NF.

18 Claims, 11 Drawing Sheets

(56) References Cited

U.S. PATENT DOCUMENTS

| | | | |
|---|---|---|---|
| 8,620,858 | B2 | 12/2013 | Backholm et al. |
| 8,767,705 | B2 | 7/2014 | Göppner et al. |
| 8,811,372 | B2 | 8/2014 | Li et al. |
| 8,824,449 | B2 | 9/2014 | van der Wateren et al. |
| 9,386,551 | B2 | 7/2016 | Zhou et al. |
| 9,832,719 | B2 * | 11/2017 | Horn .................... H04W 8/065 |
| 10,833,938 | B1 | 11/2020 | Rajput et al. |
| 2004/0062278 | A1 | 4/2004 | Hadzic et al. |
| 2008/0165761 | A1 | 7/2008 | Goppner et al. |
| 2009/0006652 | A1 | 1/2009 | Kasatani |
| 2009/0024727 | A1 | 1/2009 | Jeon et al. |
| 2014/0075004 | A1 | 3/2014 | Van Dusen et al. |
| 2017/0109819 | A1 * | 4/2017 | Amtrup .............. G06Q 20/3223 |
| 2019/0068748 | A1 * | 2/2019 | Abdel-Maguid ....... H04L 51/42 |

OTHER PUBLICATIONS

Notice of Allowance and Fee(s) Due for U.S. Appl. No. 16/527,988 (dated Sep. 17, 2020).

Ex Parte Quayle Action for U.S. Appl. No. 16/527,988 (Jun. 1, 2020).

Commonly-Assigned, co-pending U.S. Appl. No. 16/527,988 for "Methods, Systems, and Computer Readable Media for Network Function (NF) Topology Synchronization," (Filed Jul. 31, 2019).

"Checksum," Wikipedia, pp. 1-4 (Jul. 18, 2021).

"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).

3rd Generation Partnership Project; Technical Specification Group Services and System Aspects; Procedures for the 5G System (5GS); Stage 2 (Release 17), 3GPP TS 23.502, V17.1.0, pp. 1-692 (Jun. 2021).

3rd Generation Partnership Project; Technical Specification Group Services and System Aspects; System architecture for the 5G System (5GS); Stage 2 (Release 17), 3GPP TS 23.501, V17.1.1, pp. 1-526 (Jun. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Services and System Aspects; Security architecture and procedures for 5G system (Release 17)," 3GPP TS 33.501 V17.3.0 pp. 1-258 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

Hardt et al., "The OAuth 2.0 Authorization Framework," Internet Engineering Task Force (IETF), Request for Comments 6749, pp. 1-76 (Oct. 2012).

Commonly-assigned, co-pending U.S. Appl. No. 17/583,177 for "Methods, Systems, and Computer Readable Media for Handling Hacker Intrusion in Profile Management at Network Function (NF) Repository Function (NRF)," (Unpublished, filed Jan. 24, 2022).

\* cited by examiner

METHODS, SYSTEMS, AND COMPUTER READABLE MEDIA FOR OPTIMIZING NETWORK BANDWIDTH UTILIZATION THROUGH INTELLIGENT UPDATING OF NETWORK FUNCTION (NF) PROFILES WITH NF REPOSITORY FUNCTION

TECHNICAL FIELD

The subject matter described herein relates to updating NF profiles with the NRF. More particularly, the subject matter described herein relates to methods, systems, and computer readable media for optimized network bandwidth utilization through intelligent updating of NF profiles with the NRF.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks can occur when NRFs are deployed in a geo-redundant manner, one NRF fails, and the mate NRF that takes over operation for the failed NRF automatically requests full NF profile updates for each NF from which the mate NRF receives an NF heart-beat request, even when some of the NF profiles are unchanged. The exchange of messaging to update NF profiles that are unchanged is unnecessary and should be avoided. Accordingly, there exists a need for methods, systems, and computer readable media for optimized network bandwidth utilization through intelligent updating of NF profiles with the NRF.

SUMMARY

A method for optimizing network bandwidth utilization through intelligent updating of network function (NF) profiles includes, at an NF repository function (NRF), receiving, from a first NF that previously communicated with a failed geo-redundant mate of the NRF as primary, an NF heart-beat request message. The method further includes locating an NF profile for the first NF in an NF profiles database maintained by the NRF. The method further includes computing an NF profile data modification detection value for the NF profile. The method further includes transmitting the NF profile data modification detection value to the first NF.

According to another aspect of the subject matter described herein, the method for optimizing network bandwidth utilization through intelligent updating of NF profiles includes, at the first NF, receiving the NF profile data modification detection value, computing an NF profile data modification detection value for an NF profile of the first NF stored locally by the first NF, comparing the NF profile data modification detection value received from the NRF with the NF profile data modification detection value computed for the NF profile stored locally by the first NF, determining that the NF profile data modification detection value received from the NRF matches the NF profile data modification value computed for the NF profile stored locally by the first NF, and, in response to determining that the NF profile data modification detection value received from the NRF matches the NF profile data modification detection value computed for the NF profile stored locally by the first NF, refraining from sending an NF profile update to the NRF.

According to another aspect of the subject matter described herein, the method for optimizing network bandwidth utilization through intelligent updating of NF profiles includes, at the NRF, receiving NF profile updates from the geo-redundant mate of the NRF prior to failure of the geo-redundant mate of the NRF.

According to another aspect of the subject matter described herein, the method for optimizing network bandwidth utilization through intelligent updating of NF profiles includes locating the NF profile by performing a lookup in the NF profiles database maintained by the NRF using an NF instance ID received in the NF heart-beat request message.

According to another aspect of the subject matter described herein, computing the NF profile data modification detection value for the NF profile of the first NF located in the NF profiles database maintained by the NRF includes computing a checksum of the NF profile of the first NF located in the NF profiles database maintained by the NRF.

According to another aspect of the subject matter described herein, transmitting the NF profile data modification detection value to the first NF includes transmitting the NF profile data modification detection value to the first NF in a 204 No Content message.

According to another aspect of the subject matter described herein, the method for optimizing network bandwidth utilization through intelligent updating of NF profiles includes, at the NRF, receiving, from a second NF, an NF heart-beat request message, locating an NF profile for the second NF in the NF profiles database maintained by the NRF, computing an NF profile data modification detection value for the NF profile for the second NF, transmitting the NF profile data modification detection value computed for the NF profile of the second NF to the second NF, at the second NF, receiving the NF profile data modification detection value computed for the NF profile of the second NF, computing an NF profile data modification detection value for an NF profile of the second NF stored locally by the second NF, comparing the NF profile data modification detection value received from the NRF with the NF profile data modification detection value computed for the NF profile of the second NF stored locally by the second NF, determining that the NF profile data modification detection value received from the NRF does not match the NF profile data modification detection value computed for the NF profile stored locally by the second NF, and, in response to determining that the NF profile data modification detection value computed for the NF profile of the second NF and received from the NRF does not match the NF profile data modification detection value computed for the NF profile stored locally by the second NF, sending an NF profile update to the NRF.

According to another aspect of the subject matter described herein, sending the NF profile update to the NRF includes sending an NF update request message to the NRF.

According to another aspect of the subject matter described herein, the method for optimizing network bandwidth utilization through intelligent updating of NF profiles includes, at the NRF, maintaining an intelligent NF profile update feature support database indicating whether NFs support intelligent NF profile updating.

According to another aspect of the subject matter described herein, the method for optimizing network bandwidth utilization through intelligent updating of NF profiles includes, at the NRF, prior to computing the NF data modification detection value, accessing the intelligent NF profile update feature support database and determining that the first NF supports intelligent NF profile updating.

According to another aspect of the subject matter described herein, a system for optimizing network bandwidth utilization through intelligent updating of network function (NF) profiles is provided. The system includes an NF repository function (NRF) including at least one processor. The system further includes an NF profiles update manager implemented by the at least one processor for receiving, from a first NF, which previously communicated with a failed geo-redundant mate of the NRF as primary, an NF heart-beat request message, locating an NF profile for the first NF in an NF profiles database maintained by the NRF, computing an NF profile data modification detection value for the NF profile, and transmitting the NF profile data modification detection value to the first NF.

According to another aspect of the subject matter described herein, the system for optimizing network bandwidth utilization through intelligent updating of NF profiles includes an NF profile update controller implemented by the first NF for receiving the NF profile data modification detection value, computing an NF profile data modification detection value for an NF profile of the first NF stored locally by the first NF, comparing the NF profile data modification detection value received from the NRF with the NF profile data modification detection value computed for the NF profile stored locally by the first NF, determining that the NF profile data modification detection value received from the NRF matches the NF profile data modification detection value computed for the NF profile stored locally by the first NF, and, in response to determining that the NF profile data modification detection value received from the NRF matches the NF profile data modification detection value computed for the NF profile stored locally by the first NF, refraining from sending an NF profile update to the NRF.

According to another aspect of the subject matter described herein, the NRF is configured to receive NF profile updates from the geo-redundant mate of the NRF prior to failure of the geo-redundant mate of the NRF.

According to another aspect of the subject matter described herein, the NF profiles update manager is configured to locate the NF profile by performing a lookup in the NF profiles database maintained by the NRF using an NF instance ID received in the NF heart-beat request message.

According to another aspect of the subject matter described herein, the NF profile data modification detection value includes a checksum of the NF profile of the first NF located in the NF profiles database maintained by the NRF.

According to another aspect of the subject matter described herein, the NF profiles update manager is configured to transmit the NF profile data modification detection value to the first NF in a 204 No Content message.

According to another aspect of the subject matter described herein, the system for optimizing network bandwidth utilization through intelligent updating of NF profiles includes a second NF, and the NF profiles update manager is configured to receive, from the second NF, an NF heart-beat request message, locate an NF profile for the second NF in the NF profiles database maintained by the NRF, compute an NF profile data modification detection value for the NF profile for the second NF, transmit the NF profile data modification detection value computed for the NF profile of the second NF to the second NF.

The second NF is configured to receive the NF profile data modification detection value computed for the NF profile of the second NF, compute an NF profile data modification detection value for an NF profile of the second NF stored locally by the second NF, compare the NF profile data modification detection value received from the NRF with the NF profile data modification detection value computed for the NF profile of the second NF stored locally by the second NF, determine that the NF profile data modification detection value computed for the second NF and received from the NRF does not match the NF profile data modification detection value computed for the NF profile stored locally by the second NF, and, in response to determining that the NF profile data modification detection value computed for the NF profile of the second NF and received from the NRF does not match the NF profile data modification detection value computed for the NF profile stored locally by the second NF, send an NF profile update to the NRF.

According to another aspect of the subject matter described herein, sending the NF profile update to the NRF includes sending an NF update request message to the NRF.

According to another aspect of the subject matter described herein, the system for optimizing network bandwidth utilization through intelligent updating of NF profiles includes an intelligent NF profile update feature support database maintained by the NRF indicating whether NFs support intelligent NF profile updating.

According to another aspect of the subject matter described herein, the NF profiles update manager is configured to, prior to computing the NF profile data modification detection value, access the intelligent NF profile update feature support database and determine that the first NF supports intelligent NF profile updating.

According to another aspect of the subject matter described herein, a non-transitory computer readable media having stored thereon executable instructions that when executed by a processor of a computer control the computer to perform steps is provided. The steps are performed at a network function (NF) repository function (NRF). The steps include receiving, from a first NF that previously communicated with a failed geo-redundant mate of the NRF as primary, an NF heart-beat request message. The steps further include locating an NF profile for the first NF in an NF profiles database maintained by the NRF. The steps further include computing an NF profile data modification detection value for the NF profile. The steps further include transmitting the NF profile data modification detection value to the first NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
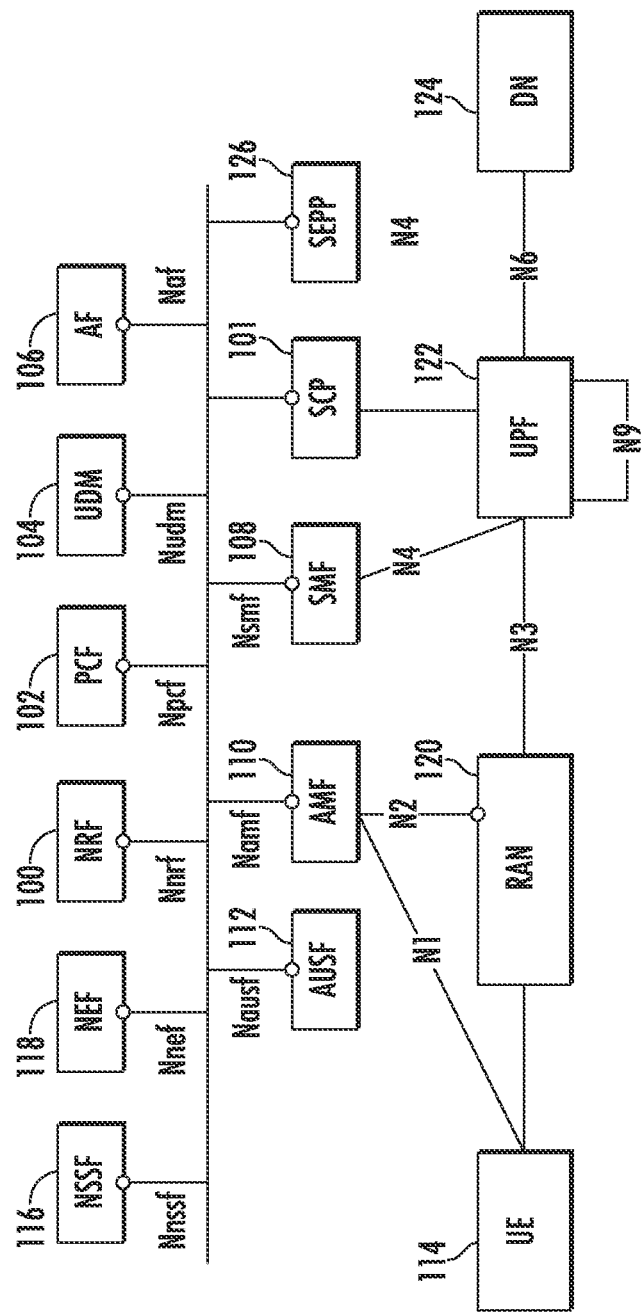
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As described above, one problem with the 3GPP network architecture for 5G networks is that NFs update their NF profiles with an NRF after failure of a geo-redundant mate of the NRF even in cases where the NF profiles stored with the NRF are not in need of updating because the NF profiles are current. When an NRF that is geo-redundantly deployed fails, the NFs previously communicating with the failed NRF select a geo-redundant mate of the failed NRF and start heart-beating with the new NRF. 3GPP TS 29.510 defines the following three response status codes for NF update and NF heart-beat request messages:

204 No Content—sent in response to a successful NF heart-beat request.
  200 OK along with the full NF profile—sent in response to a successful NF heart-beat request in cases where the NRF determines that the NF profile has changed significantly since the last heart-beat and wants the NF service consumer to send an updated NF profile. This alternative has significant signaling overhead and is applicable to both NF update and NF heart-beat responses.
  404 Not Found—sent in response to an NF heart-beat or NF update request when an error occurs. The status code carried in the problem details information element (IE) provides details of the error. The 404 Not Found status code is applicable to both NF update and NF heart-beat response.

Bulk NF registration/NF updating of NF profiles from 5GC NFs registered with the primary NRF to a secondary NRF is performed if the serving primary NRF fails and the communication channel between geo-redundant (GR) mated NRFs is impaired.

NF registration/NF updating of NF profiles from 5GC NFs (which were initially registered with the primary NRF) to the secondary NRF is needed, as the secondary NRF may have stale NF profiles due to the communication channel between geo-redundant mated NRFs being impaired. In this scenario, the secondary NRF will either send a 200 OK message with the full NF profile of the NF or a 404 Not Found message (based on 3GPP TS 29.510 and operator policy), expecting the NF to either register or send an NF update. Both 200 OK full profile and 404 Not Found responses will cause NF profiles to be exchanged between NFs and the NRF to synchronize the NF profiles. This procedure is inefficient from a network bandwidth usage perspective as the NF profile is exchanged even if the secondary NRF has the latest NF profile for a particular NF. Because the NRF has no mechanism to know if it has the latest NF profile or a stale NF profile for a particular NF, the NRF is required to ask all the registered NFs to perform NF registration/NF updating of the NF profile.

The subject matter described herein includes a procedure to exchange the NF profile between NFs and the NRF only when the secondary NRF has a stale NF profile, which optimizes network bandwidth utilization. This procedure involves configuring the secondary NRF to send a 204 No Content message with an NF profile checksum rather than a 200 OK message with the full NF profile or 404 Not Found message response on receiving heart-beat requests from 5GC NFs (all registered NF to the primary NRF) in the scenarios of primary NRF failures and the communication channel between geo-redundant mated NRFs being impaired. 5G NFs will use the checksum received in 204 the No Content response for the heart-beat request to determine if the secondary NRF has the latest or a stale NF profile and act accordingly to perform NF registration/NF updating of the NF profile only if required.

Figure 2:
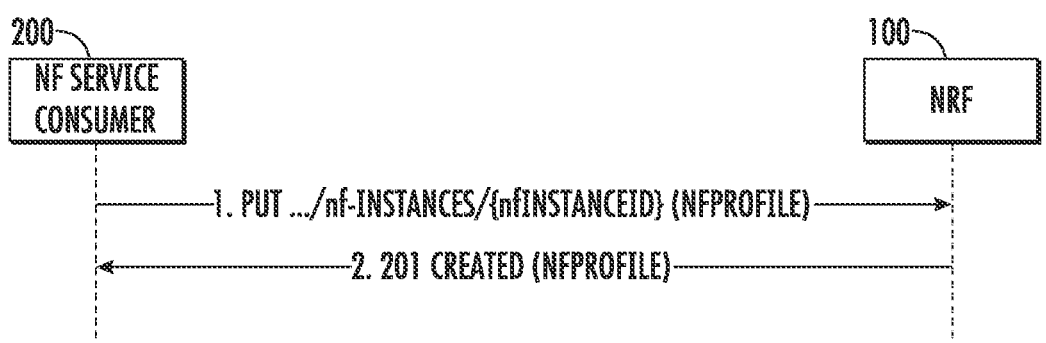
FIG. 2 is a message flow diagram illustrating exemplary messages exchanged for an NF register service operation.

FIG. 2 is a message flow diagram illustrating exemplary messages exchanged during the NF register service operation. Referring to FIG. 2, in line 1, NF service consumer 200 initiates the NF register service operation by sending an HTTP PUT message to NRF 100. The HTTP PUT message contains the full NF profile of NF service consumer 200. NRF 100 receives the NF profile and stores the NF profile in its NF profile database. In line 2, NRF 100 responds with a 201 Created message indicating successful registration of the NF profile of NF service consumer 200. After registration of the NF profile, the NF profile is discoverable by other NFs in the network.

Figure 3:
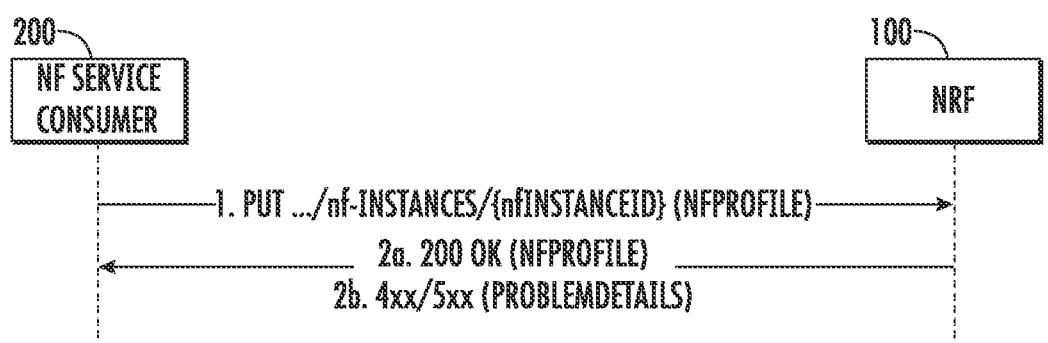
FIG. 3 is a message flow diagram illustrating exemplary messages exchanged for an NF update service operation.
Figure 4:
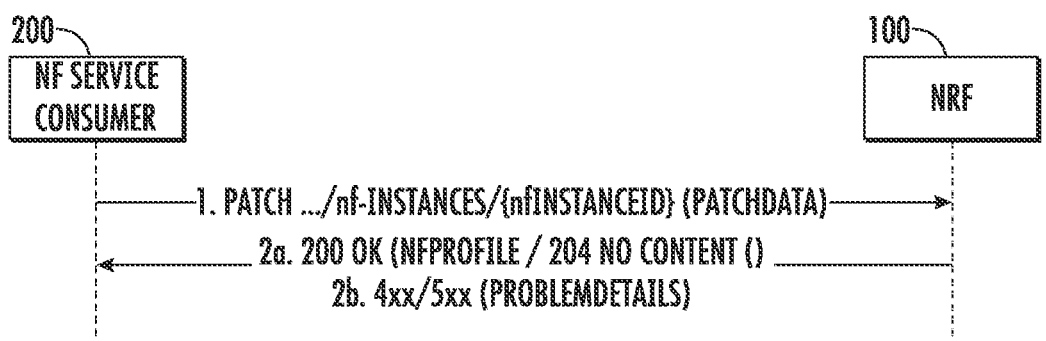
FIG. 4 is a message flow diagram illustrating exemplary messages exchanged for an NF heart-beat service operation.

FIG. 3 is a message flow diagram illustrating exemplary messages exchanged for the NF update service operation. According to the NF update service operation, an NF service consumer previously registered with the NRF can provide it's updated NF profile to the NRF. The NF update service operation can replace the full NF profile with a new NF profile or only update a portion of the NF profile. Referring to the message flow in FIG. 3, in line 1, an NF service consumer 200 sends an HTTP PUT operation to update its previously registered NF profile with NRF 100. If the NF update operation is successful, NRF 100 responds as indicated in line 2a with a 200 OK message. If the NF update operation is not successful, NRF 100 responds as illustrated in line 2b with a 4xx or 5xx message indicating problem details FIG. 4 is a message flow diagram illustrating exemplary messages exchanged for an NF heart-beat service operation. According to the NF heart-beat service operation, an NF service consumer that previously registered with the NRF must periodically contact the NRF with an NF heart-beat request to show that the NF service consumer is still operational. The NF heart-beat service operation also applies when and NRF fails and the NF service consumer seeks to contact a geo-redundant mate of the failed NRF. Referring to the message flow in FIG. 4, in line 1, NF service consumer 200 sends an NF heart-beat request message to NRF 100 in the form of an HTTP PATCH message. NRF 100 can respond with a 200 OK message including the full NF profile of the NF service consumer 200 or a 204 No Content message. The typical procedure after a failure of a geo-redundant mate is to respond as indicated in line 2a with a 200 OK message requesting the full NF profile of NF service consumer 200. NRF 100 may also respond as indicated in line 2b with a 4xx or 5xx message indicating problem details if the NF heart-beat request is not successful.

Figure 5:
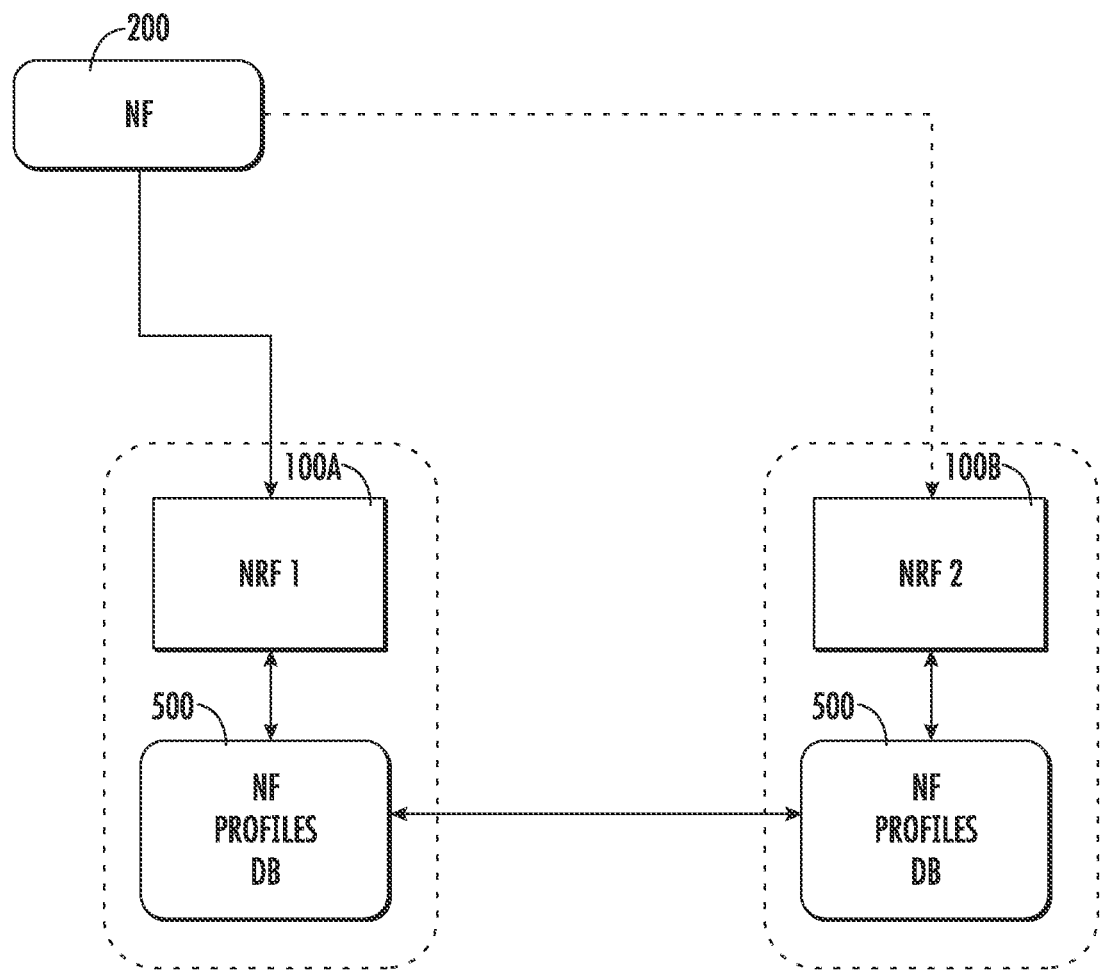
FIG. 5 is a network diagram illustrating a geo-redundant NRF deployment where an NF registers with one NRF, and that NRF replicates its NF profiles database to a geo-redundant mate NRF.

FIG. 5 is a network diagram illustrating typical geo-redundant deployment of NRFs in a 5G network. In FIG. 5, an operator may deploy mated pairs of NRFs at geographically diverse sites. In the illustrated example, NRFs 100A and 100B are a first mated pair respectively deployed at different sites, which may be part of the same datacenter at the same geographic location. NRFs 100A and 100B share network NF profile information and subscriptions to NF profiles and form an NRF set, which is a logical grouping of NRFs that can provide the same service.

In the illustrated example, geo-redundant NRFs 100A and 100B maintain identical copies of NF profiles database 500. If any record is created as part of NF registration at any GR NRF site, then that record is accessible to other NRFs in the GR set. A database tier layer (not shown in FIG. 5) ensures that the replication of records takes place in almost real time across all of the GR NRF sites. If an NF is registered to NRF1 100A and NRF1 100A goes down, then the service is not impaired for NF 200, as NF 200 will contact an available GR NRF 100B of the next highest priority as the secondary NRF. NF 200 will start heart-beating with secondary NRF 100B. Secondary NRF 100B will seamlessly take the ownership of the NF record to provide NRF services, such as management, discovery, and access token service, for NF 200.

Figure 6:
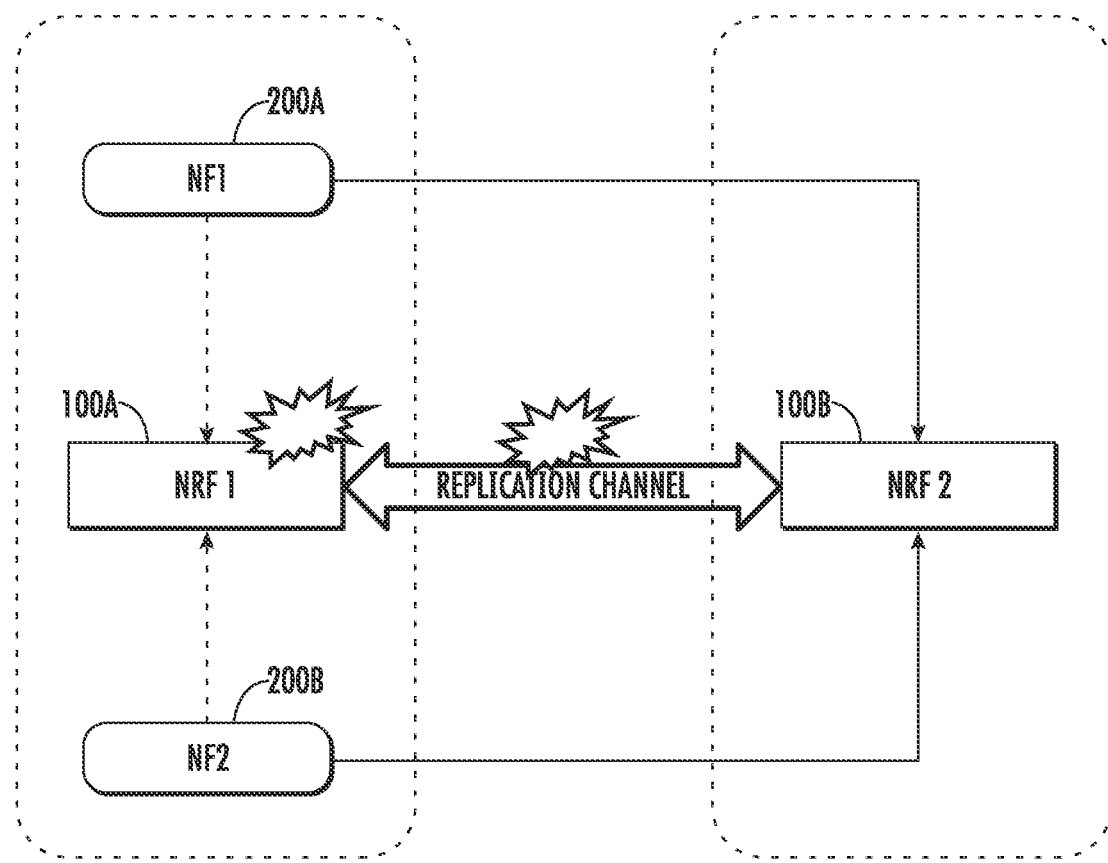
FIG. 6 is a diagram illustrating failure of a database replication channel between geo-redundantly deployed NRFs.

FIG. 6 illustrates the case were one NRF of the geo-redundantly deployed NRFs fails. NRF1 100A and NRF2 100B are located at geo-redundant sites; and NF profile records for NF1 200A and NF2 200B are replicated between these two sites. In FIG. 6, if NF1 200A and NF2 200B are already registered with NRF1 100A and if NRF1 100A fails, then NF1 200A and NF2 200B will start heart-beating with an available GR secondary NRF, which in FIG. 6 is NRF2 100B.

In response to receiving an NF heart-beat request, NRF2 100B will start owning/considering the NF records for NRF management services if the communication channel between geo-redundant mated NRFs is healthy. If the communication channel between geo-redundant mated NRFs is impaired, the NF profiles of NF1 200A and NF2 200B at NRF2 100B may be stale/outdated. To update the NF profiles of NF1 200A and NF2 200B, NRF2 100B implements the following procedure as specified in 3GPP TS 29.510:

Send 404 Not Found for an heart-beat request for which an NF profile is not stored in NF profiles database 500.

Send 200 OK along with the full NF profile, e.g., in cases where the NRF determines that the NF profile has changed significantly since the last heart-beat and wants to obtain the new profile from the NF service consumer.

The above mentioned procedures result in signalling overhead where the NF profiles are transmitted over the signalling path consume a major portion of bandwidth resources. If the primary NRF goes down, all its registered NFs will switch to the secondary NRF, which involves a burst of NF profile exchanges between NFs and the secondary NRF, even though there may be no change between the NF profile stored at the NF and at the NRF. This is very inefficient from a network bandwidth usage and signalling perspective.

Figure 7:
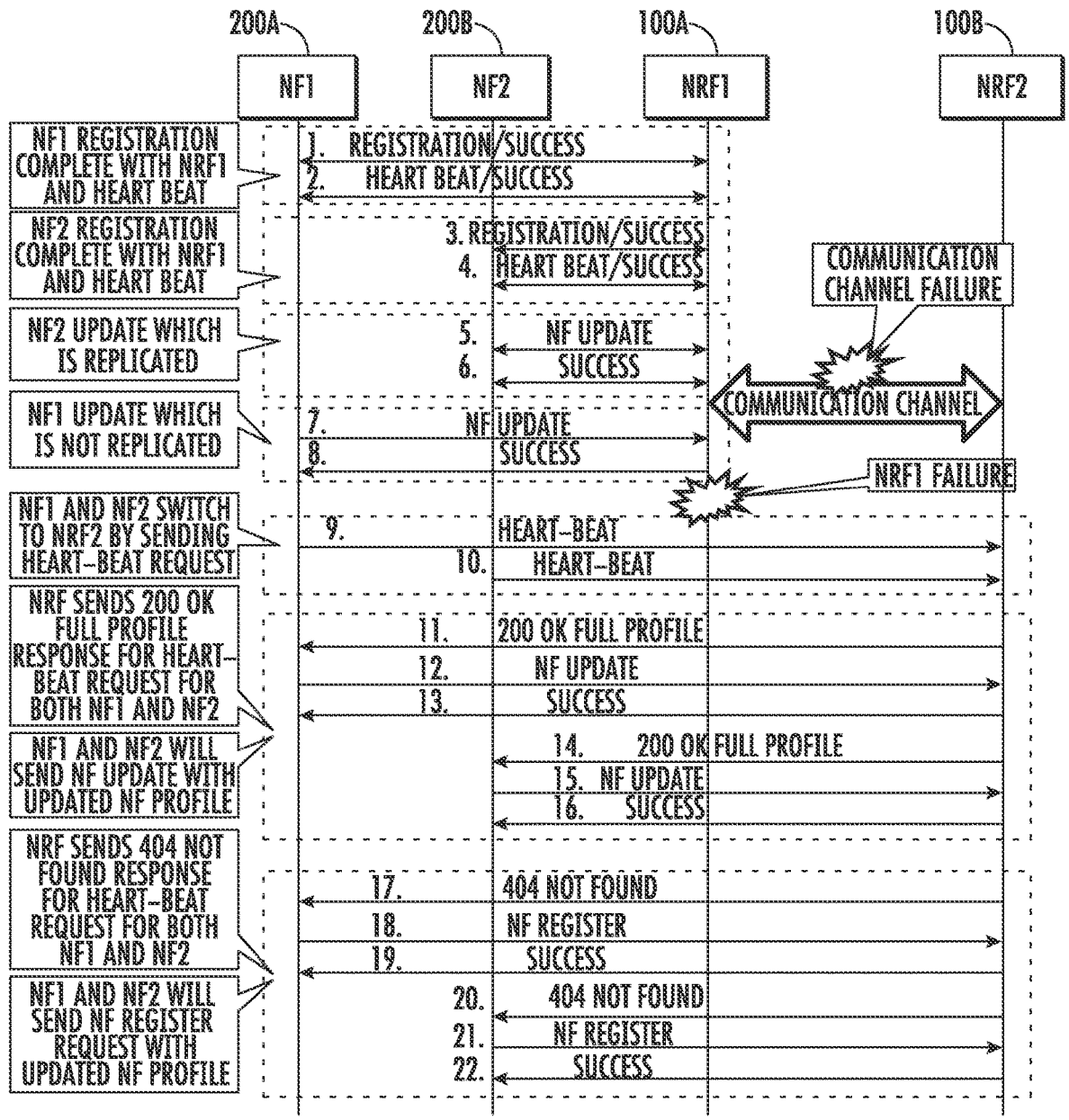
FIG. 7 is a message flow diagram illustrating exemplary messages exchanged after failure of an NRF where full NF profile updates occur for each NF that heart-beats with a geo-redundant mate of the failed NRF.

FIG. 7 is a message flow diagram illustrating exemplary signaling exchanged when all of the NFs update their profiles with an NRF when a mated NRF fails. Referring to FIG. 7, in line 1, NF1 200A successfully registers its NF profile with NRF1 100A. In line 2, NF1 200A successfully heart-beats with NRF1 100A. In line 3, NF2 200B successfully registers its NF profile with NRF1 100A. In line 4, NF2 200B successfully heart-beats with NRF1 100A.

In line 5, NF2 200B sends an NF profile update to NRF1 100A. In line 6, NRF1 100A responds to NF2 200B indicating that the NF update operation was successful. After line 6, the communication channel between NRF1 100A and NRF2 100B fails so that NRF2 100B does not receive NF profile database synchronization updates from NRF1 100A. In line 7, NF1 200A sends an NF update message to NRF1 100A. In line 8, NRF1 100A responds to NF1 200A indicating that the NF update operation was successful. Because the communication channel between NRF1 100A and NRF2 100B is down, NRF2 100B does not receive a database synchronization update from NRF1 100A that includes the NF profile update from NF1 200A.

After line 8, it is assumed that NRF1 100A fails. Accordingly, in line 9, NRF1 100A heart-beats with NRF2 100B. In line 10, NF2 200B heart-beats with NRF2 100B. In line 11, NRF2 100B responds to NF1 100A with a 200 OK message including the full NF profile of NF1 100A. In line 12, NF1 200A sends an NF update message with the full NF profile of NF1 200A to NRF2 100B. In line 13, NRF2 100B responds to the NF update message with a message indicating a successful NF update operation.

In line 14, NRF2 100B sends a 200 OK message with the full NF profile of NF2 200B to NF2 200B. In line 15, NF2 200B sends an NF update message including the full NF profile of NF2 200B to NRF2 100B. In line 16, NRF2 100B responds to the NF update message indicating that the NF update operation was successful.

Lines 17 through 22 illustrate alternate responses by NRF2 100B to the NF heart-beat requests from NF1 200A and NF2 200B if NRF2 100B does not include the NF profiles of NF1 200A and NF2 200B. In line 17, NRF2 200B responds to the NF heart-beat request from NF1 200A with a 404 Not Found message, indicating that the NF profile of NF1 200A is not present in the version of the NF profiles database maintained by NRF2 100B. In line 18, NF1 200A sends an NF register message to NRF2 200B with the full profile of NF1 100A. In line 19, NRF2 100B responds to the NF register message with a success message indicating that the registration was successful In line 20, NRF2 100B responds to the NF heart-beat request from NF2 200B with a 404 Not Found message indicating that the NF profile of NF2 200B is not present in the NF profiles database maintained by NRF2 100B. In line 21, NF2 200B sends an NF register message to NRF2 200B with the full NF profile of NF2 200B. In line 22, NRF2 200B responds to the NF register message with a success message indicating that the registration was successful.

FIG. 7 illustrates both the necessary and unnecessary exchange of NF profiles when a geo-redundant mate NRF takes over for a failed NRF. For example, if NRF2 100B already has the full NF profile of NF2 200B prior to the communication channel failure, there is no need for NRF2 100B to send the 200 OK message in line 14 with the full NF profile of NRF2 100B in line 14 or for NF2 200B to send the NF update with the full NF profile of NF2 200B in line 15. However, because the NF profile of NF1 200A was updated in lines 7 and 8 after the communications channel failure, NRF2 100B needs to request an NF profile update for NF1 200A. Using existing 3GPP-defined procedures, there is no way for NRF2 100B to know whether the NF profiles that it has are stale or not after a communications channel failure with a geo-redundant mate NRF.

Figure 8:
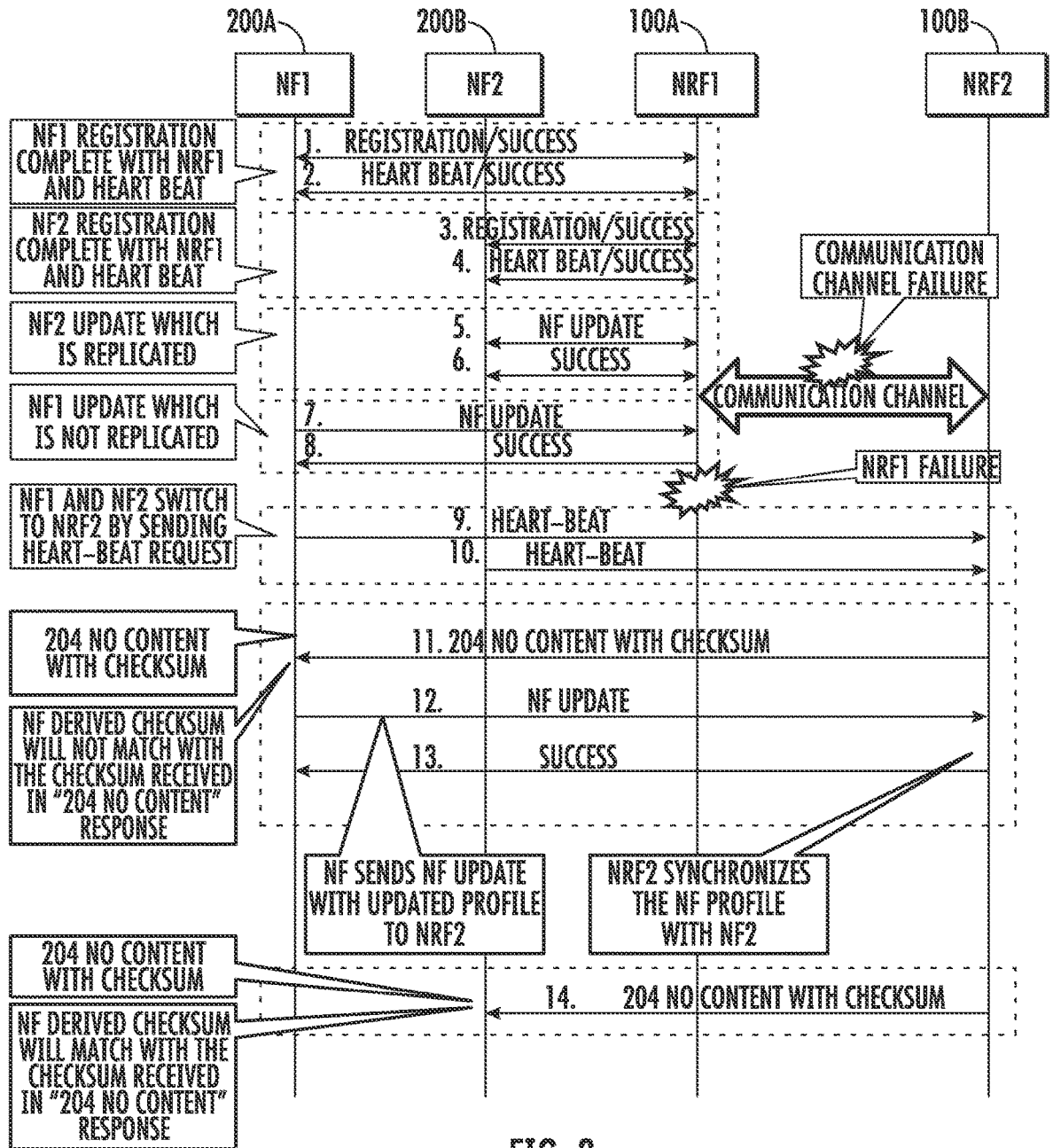
FIG. 8 is a message flow diagram illustrating exemplary messages exchanged after failure of an NRF where the geo-redundant mate and the NFs perform intelligent NF profile updating.

In order to avoid this difficulty, the subject matter described herein includes a method for intelligent NF profile updating after an NRF failure. FIG. 8 is a message flow diagram illustrating exemplary messages exchanged for intelligent NF profile updating after an NRF failure. Referring to FIG. 8, in line 1, NF1 200 successfully registers its NF profile with NRF1 100A. In line 2, NF1 200A successfully heart-beats with NRF1 100A. In line 3, NF2 200B successfully registers its NF profile with NRF1 100A. In line 4, NF2 200B successfully heart-beats with NRF1 100A.

In line 5, NF2 200B sends an NF profile update to NRF1 100A. In line 6, NRF1 100A responds to NF2 200B indicating that the NF update operation was successful. After line 6, the communication channel between NRF1 100A and NRF2 100B fails so that NRF2 100B does not receive NF profiles database synchronization updates from NRF1 100A. In line 7, NF1 200A sends an NF update message to NRF1 100A. In line 8, NRF1 100A responds to NF1 200A indicating that the NF update operation was successful. Because the communication channel between NRF1 100A and NRF2 100B is down, NRF2 100B does not receive an NF profiles database synchronization update that includes the NF profile update from NF1 200A.

After line 8, it is assumed that NRF1 100A fails. Accordingly, in line 9, NRF1 100A heart-beats with NRF2 100B. In line 10, NF2 200B heart-beats with NRF2 100B. In line 11, rather than responding with a 200 OK message with the full NF profile of NF2 200B, NRF2 100B responds to NF1 100A with a 204 No Content message including a checksum or other suitable data integrity check value of the NF profile of NF1 100A currently in the NF profiles database maintained by NRF2 100B. NF1 100A receives the 204 No Content message with the checksum, computes the checksum of its NF profile, and compares the computed checksum to the checksum received in the 204 No Content message. In this case, the checksums do not match because the NF profile of NF1 200A was updated after the communication channel failure between NRF1 100A and NRF2 100B, and the update was not communicated to NRF2 100B. Accordingly, in line 12, NF1 200A sends an NF update message with the full NF profile of NF1 200A to NRF2 100B. In line 13, NRF2 100B responds to the NF update message with a message indicating a successful NF update operation.

In line 14, NRF2 100B responds to the NF heart-beat from NF2 200B with a 204 No Content message including a checksum of the version of the NF profile of NF2 100B in the NF profiles database of NRF2 100B. NF2 200B receives the 204 No Content message with the checksum, computes a checksum of its NF profile, and compares the computed checksum to the checksum received in the 204 No Content message. In this case, the checksums match because the NF profiles are the same. Accordingly, an NF profile update is not needed, and the unnecessary exchange of NF profiles is avoided, improving network bandwidth utilization.

Figure 9:
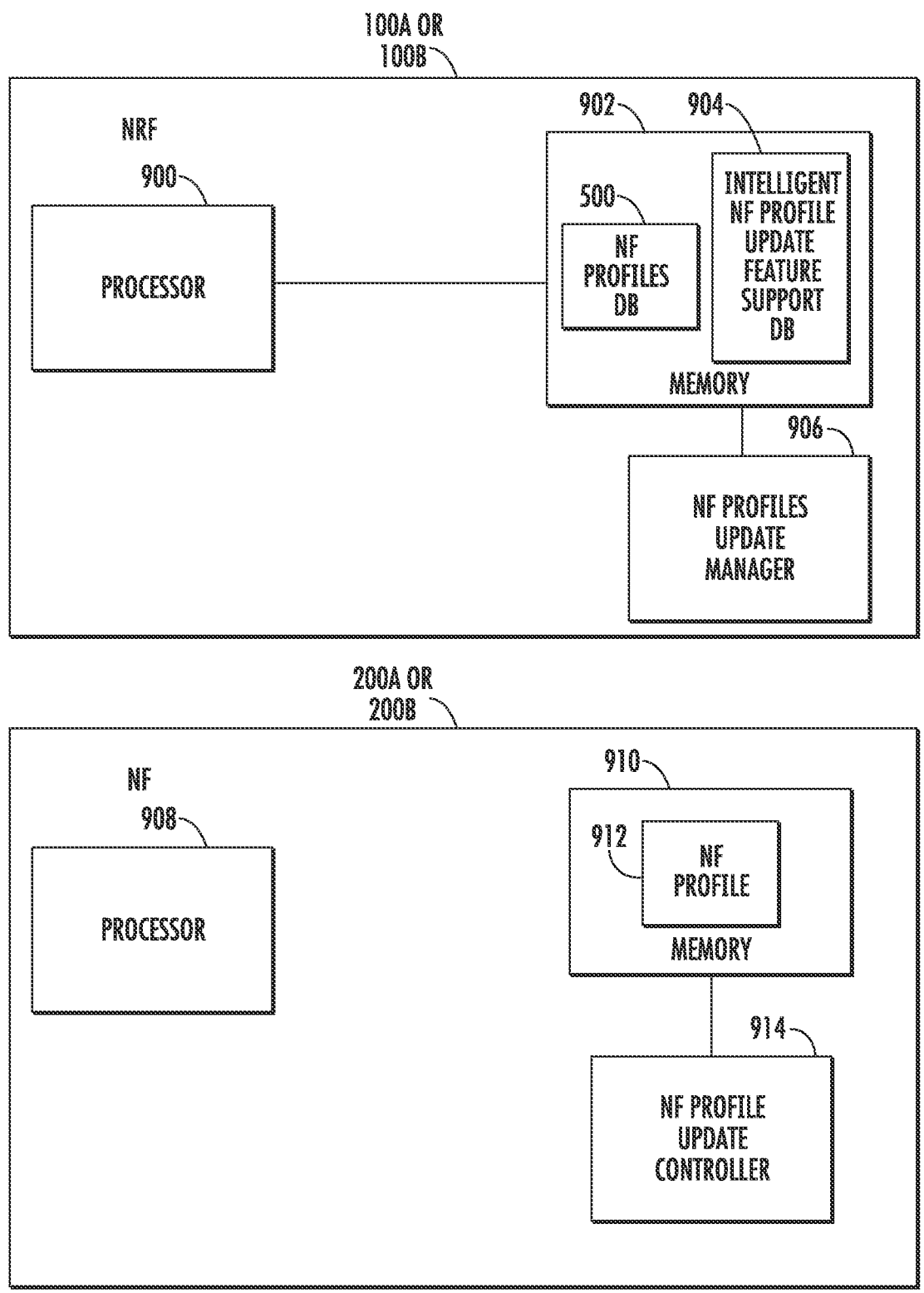
FIG. 9 is a block diagram illustrating exemplary architectures of an NRF and an NF for intelligent NF profile updating after failure of an NRF.

FIG. 9 is a block diagram illustrating exemplary architectures for NRF 100A or 100B and NF 200A or 200B to support smart NF profile updating as described herein. Referring to FIG. 9, NRF 100A or 100B includes at least one processor 900 and memory 902. Memory 902 may include NF profiles database 500 that stores the NF profiles of NFs that are registered with NRF 100A or 100B. Memory 902 may also include an intelligent NF profile update feature support database 904 that indicates whether or not NFs support intelligent NF profile updating as described herein. Table 1 shown below illustrates exemplary content that may be stored in intelligent NF profile update feature support database 904.

TABLE 1

Intelligent NF Profile Updating Feature Support

| NF Criteria | Feature Flag | Remarks |
| --- | --- | --- |
| NF InstanceID = NF1 | TRUE | Feature enabled |
| NF Type = UDM | TRUE | Feature enabled |
| NF Locality = Datacenter1 | TRUE | Feature enabled |
| ALL | FALSE | Feature disabled |

In Table 1, the first column contains matching criteria for each record usable to determine whether intelligent NF profile updating is supported. For example, the first cell in column 1 indicates that an NF with NF instance ID NF1 supports intelligent NF profile updating. The second cell in column 1 indicates that all NFs of NF type UDM support intelligent NF profile updating. The third cell in column 1 indicates that NFs with a locality of Datacenter1 support smart NF profile updating. The last cell in column 1 indicates that the default for NFs that do not match one of the other criteria in column 1 is that intelligent NF profile updating is not enabled.

NRF 100A or 100B further includes in NF profiles update manager 906 that registers NF profiles in NF profiles database 500 and performs the steps described herein for intelligent NF profile updating. For example, when NF profiles update manager 906 receives an NF heart-beat request from an NRF that was previously registered with a geo-redundant mate of NRF 100A or 100B. NF profiles update manager 906 may perform a lookup in intelligent NF profile update feature support database using criteria from the NF heart-beat request to determine whether intelligent NF profile updating is enabled for the NF. If intelligent NF profile updating is enabled, NF profiles update manager 906 may perform the steps described above with regard to FIG. 8 to determine whether or not an NF profile update is required for the NF. NF profiles update manager 906 may be implemented using computer executable instructions stored in memory 902 and executed by processor 900.

NF 200A or 200B includes at least one processor 908 and memory 910. Memory 910 may be configured with an NF profile 912 of NF 200A or 200B. NF profile 912 is a data structure defined in 3GPP TS 29.510 and includes attributes that describe the service or services provided by NF 200A or 200B and other information for accessing the services. NF 200A or 200B includes an NF profile update controller 914 that performs the steps described above with regard to FIG. 8 for intelligent NF profile updating. For example, NF profile update controller 914 may receive a 204 No Content message with a checksum in response to an NF heart-beat request sent to an NRF that took over for a failed NRF. NF profile update controller 914 may compute a checksum of NF profile 912, compare the checksum to the received checksum, and determine whether the checksums match. If the checksums match, NF profile update controller 914 may refrain from sending an NF profile update to the NRF. If the checksums do not match, NF profile update controller 914 may perform an NF profile update with the NRF. NF profile update controller 914 may be implemented using computer executable instructions stored in memory 910 and executed by processor 908.

Figure 10:
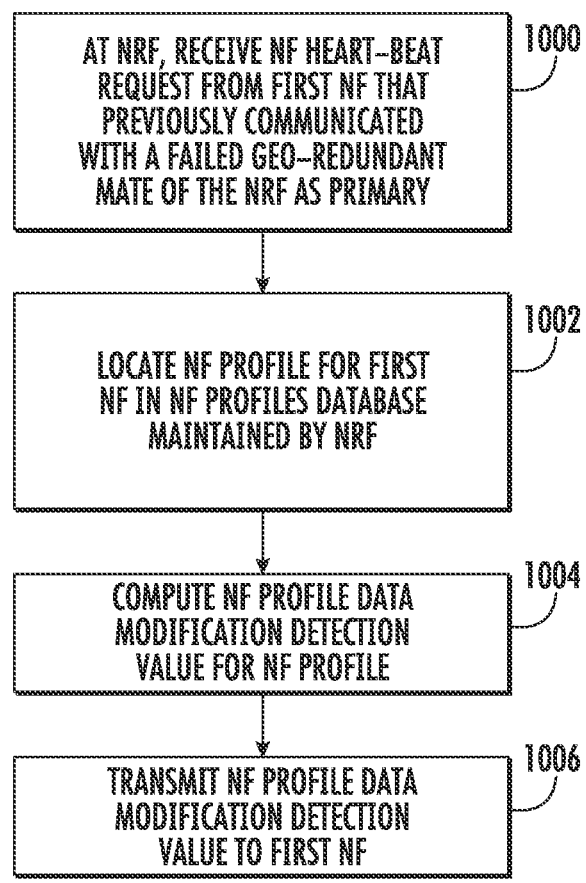
FIG. 10 is a flow chart illustrating an exemplary process performed by an NRF for intelligent NF profile updating.

FIG. 10 is a flow chart illustrating an exemplary process performed by an NRF for optimizing network bandwidth utilization through intelligent NF profile updating as described herein. Referring to FIG. 10, in step 1000, the process includes receiving, at an NRF and from a first NF that previously communicated with a failed geo-redundant mate of the NRF as primary, an NF heart-beat request message. For example, NRF 100A or NRF 100B may receive NF heart-beat requests from NFs 200A or 200B that previously communicated with a geo-redundant mate of NRF 100A or 100B.

In step 1002, the process includes locating an NF profile for the first NF in an NF profiles database maintained by the NRF. For example, NRF 100A or 100B may perform a lookup in NF profiles database 500 using an NF instance ID or other parameters received in an NF heart-beat request and locate a corresponding NF profile received from a geo-redundant mate of NRF 100A or 100B through the database replication channel prior to failure of the geo-redundant mate NRF.

In step 1004, the process includes computing an NF profile data modification detection value for the NF profile. For example, NRF 100A or 100B may use any suitable algorithm, such as a checksum, hash, message digest, or other data integrity check algorithm, to compute a value from the stored NF profile that can be used to detect modifications in the NF profile.

In step 1006, the process includes transmitting the NF profile data modification detection value to the first NF. For example, NRF 100A or 100B may transmit, in a 204 No Content message, the NF profile data modification detection value to the NF that transmitted the NF heart-beat request.

Figure 11:
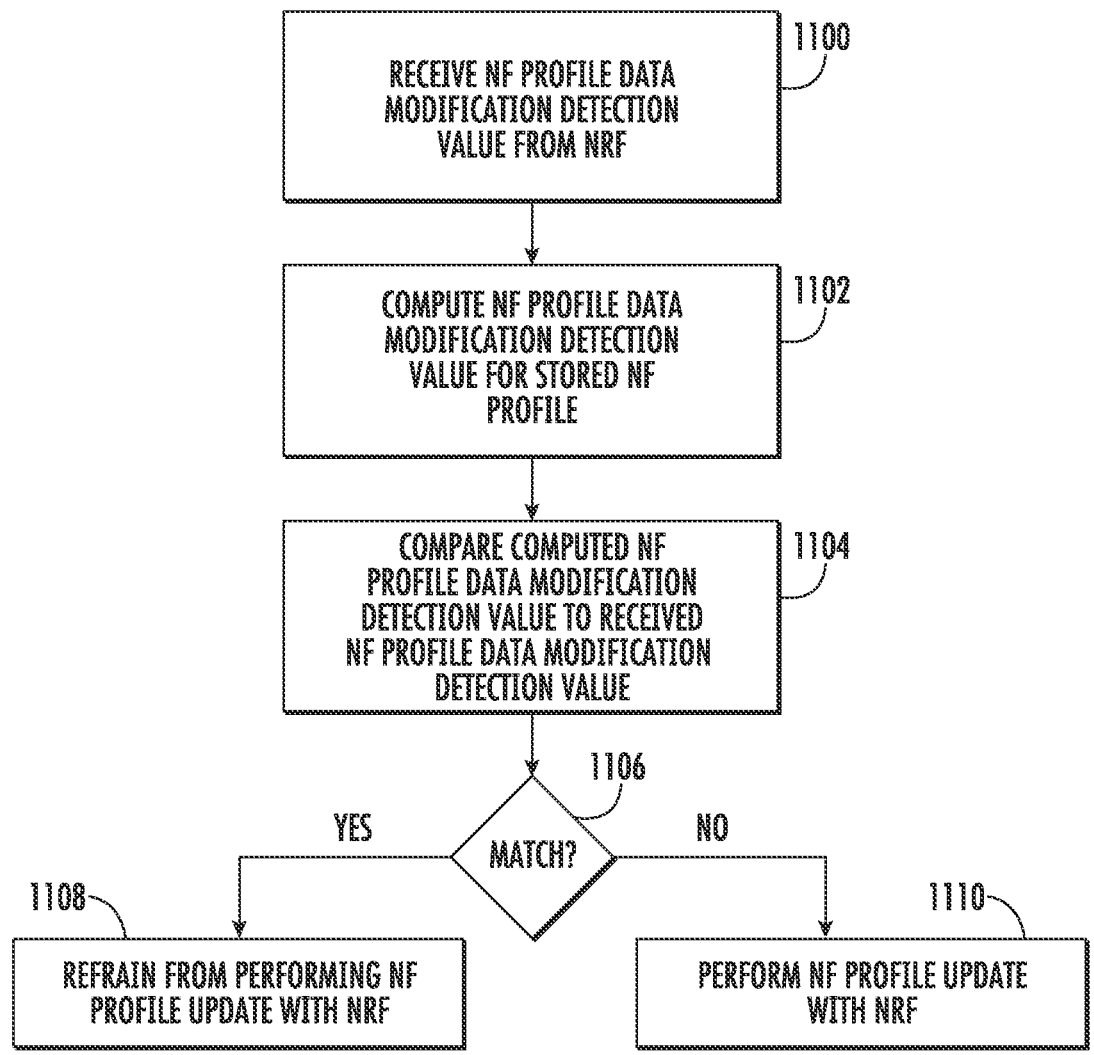
FIG. 11 is a flow chart illustrating an exemplary process performed by an NF for intelligent NF profile updating.

FIG. 11 illustrates an exemplary process performed by an NF in optimizing network bandwidth utilization using intelligent NF profile updating as described herein. Referring to FIG. 11, in step 1100, the process includes receiving the NF profile data modification detection value from the NRF. For example, NF 200A or 200B may receive a 204 No Content message from NRF 100A or 100B in response to an NF heart-beat request. The 204 No Content message may include the NF profile modification detection value computed by the NRF from the NF profile of NF 200A or 200B stored by the NRF.

In step 1102, the process includes computing an NF profile data modification detection value for an NF profile stored locally by the first NF. For example, NF 200A or 200B may compute the NF profile data modification detection value from its stored NF profile.

In steps 1104 and 1106, the process includes comparing the NF profile data modification detection value received from the NRF with the NF profile data modification detection value computed for the NF profile stored locally by the first NF. For example, NF 200A or 200B may compare its locally computed NF profile data modification detection value to the NF profile data modification detection value received from NRF 100A or 100B in the 204 No Content message.

In step 1108, the process includes determining that the NF profile data modification detection value received from the NRF matches the NF profile data modification detection value computed for the NF profile stored locally by the first NF, and, in response to determining that the NF profile data modification detection value received from the NRF matches the NF profile data modification detection value computed for the NF profile stored locally by the first NF, refraining from sending an NF profile update to the NRF. For example, NF 200A or 200B may refrain from performing an NF profile update with NRF 100A or 100B if the NF profile data modification detection values match, thereby conserving network bandwidth.

In step 1110, the process includes, in response to determining that the NF profile data modification detection value computed by the NF does not match the NF profile data modification detection value receive from the NRF, performing an NF profile update with the NRF. For example, NF 200A or 200B may transmit an NF update message with the NF profile of NF 200A or 200B to NRF 100A or 100B if the NF profile data modification detection values do not match.

Advantages of the subject matter described herein include optimizing network bandwidth utilization by performing NF profile updates after NRF failures only when the NF profiles maintained by the NRF that takes over for a failed NRF are stale. CPU and memory resources of NRFs and NFs are also conserved by avoiding unnecessary NF profile updates. The likelihood of traffic congestion caused by NF updates after an NRF failure is also reduced.

The disclosure of each of the following references is hereby incorporated herein by reference in its entirety.

REFERENCES 1. 3GPP TS 23.501 V17.1.1 (2021-06), 3rd Generation Partnership Project; Technical Specification Group Services and System Aspects; System Architecture for the 5G System (5GS), Stage 2; (Release 17).
2. 3GPP TS 23.502 V17.1.0 (2021-06), 3rd Generation Partnership Project; Technical Specification Group Services and System Aspects; Procedures for the 5G System (5GS); Stage 2, (Release 17).
3. 3GPP TS 29.510 V17.2.0 (2021-06), 3rd Generation Partnership Project; Technical Specification Group Core Network and Terminals; 5G System; Network Function Repository Services; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimizing network bandwidth utilization through intelligent updating of network function (NF) profiles, the method comprising:

at an NF repository function (NRF):
receiving, from a georedundant mate NRF and over a data replication channel between the NRF and the georedundant mate NRF, an NF profile update for a first NF that successfully updated its NF profile with the georedundant mate NRF;
after failure of the georedundant mate NRF:
receiving, from the first NF that previously communicated with the geo-redundant mate NRF as primary, an NF heart-beat request message;
receiving, from a second NF that previously communicated with the geo-redundant mate NRF as primary and that successfully updated its NF profile with the geo-redundant mate NRF but whose updated NF profile was not communicated to the NRF over the data replication channel, an NF heart-beat request message;
locating an NF profile for the first NF in an NF profiles database maintained by the NRF, computing a first NF profile data modification detection value for the NF profile, and transmitting the first NF profile data modification detection value to the first NF;
locating an NF profile for the second NF in the NF profiles database maintained by the NRF, computing a second NF profile data modification detection value for the NF profile for the second NF, and transmitting the second NF profile data modification detection value to the second NF; and receiving, from the second NF, an NF update message containing a full NF profile of the second NF.

2. The method of claim 1 comprising:

at the first NF:

receiving the first NF profile data modification detection value;

computing an NF profile data modification detection value for an NF profile of the first NF stored locally by the first NF;

comparing the first NF profile data modification detection value received from the NRF with the NF profile data modification detection value computed for the NF profile stored locally by the first NF;

determining that the first NF profile data modification detection value received from the NRF matches the NF profile data modification detection value computed for the NF profile stored locally by the first NF; and in response to determining that the first NF profile data modification detection value received from the NRF matches the NF profile data modification detection value computed for the NF profile stored locally by the first NF, refraining from sending an NF profile update to the NRF.

3. The method of claim 1 wherein locating the NF profile for the first NF includes performing a lookup in the NF profiles database maintained by the NRF using an NF instance ID received in the NF heart-beat request message from the first NF.

4. The method of claim 1 wherein computing the first NF profile data modification detection value for the NF profile of the first NF located in the NF profiles database maintained by the NRF includes computing a checksum of the NF profile of the first NF located in the NF profiles database maintained by the NRF.

5. The method of claim 1 wherein transmitting the first NF profile data modification detection value to the first NF includes transmitting the first NF profile data modification detection value to the first NF in a 204 No Content message.

6. The method of claim 1 comprising:

at the second NF:

receiving the second NF profile data modification detection value computed for the NF profile of the second NF;

computing an NF profile data modification detection value for an NF profile of the second NF stored locally by the second NF;

comparing the second NF profile data modification detection value received from the NRF with the NF profile data modification detection value computed for the NF profile of the second NF stored locally by the second NF;

determining that the second NF profile data modification detection value computed by the NRF for the second NF does not match the NF profile data modification detection value computed for the NF profile stored locally by the second NF; and in response to determining that the second NF profile data modification detection value computed for the NF profile of the second NF and received from the NRF does not match the NF profile data modification detection value computed for the NF profile stored locally by the second NF, sending the NF update message containing the full NF profile of the second NF to the NRF.

7. The method of claim 6 wherein sending the NF update message to the NRF includes sending an NF update request message to the NRF.

8. The method of claim 1 comprising, at the NRF, maintaining an intelligent NF profile update feature support database indicating whether NFs support intelligent NF profile updating.

9. The method of claim 8 comprising, at the NRF, prior to computing the first NF profile data modification detection value, accessing the intelligent NF profile update feature support database and determining that the first NF supports intelligent NF profile updating.

10. A system for optimizing network bandwidth utilization through intelligent updating of network function (NF) profiles, the system comprising:

an NF repository function (NRF) including at least one processor; and an NF profiles update manager implemented by the at least one processor for receiving, from a georedundant mate NRF and over a data replication channel between the NRF and the georedundant mate NRF, an NF profile update for a first NF that successfully updated its NF profile with the georedundant mate NRF;

after failure of the georedundant mate NRF:

receiving, from a first NF, which previously communicated with the geo-redundant mate NRF as primary, an NF heart-beat request message;

receiving, from a second NF that previously communicated with the geo-redundant mate NRF as primary and that successfully updated its NF profile with the geo-redundant mate NRF but whose updated NF profile was not communicated to the NRF over the data replication channel, an NF heart-beat request message;

locating an NF profile for the first NF in an NF profiles database maintained by the NRF, computing a first NF profile data modification detection value for the NF profile, and transmitting the first NF profile data modification detection value to the first NF;

locating an NF profile for the second NF in the NF profiles database maintained by the NRF, computing a second NF profile data modification detection value for the NF profile for the second NF, and transmitting the second NF profile data modification detection value to the second NF; and receiving, from the second NF, an NF update message containing a full NF profile of the second NF.

11. The system of claim 10 comprising an NF profile update controller implemented by the first NF for receiving the first NF profile data modification detection value, computing an NF profile data modification detection value for an NF profile of the first NF stored locally by the first NF, comparing the first NF profile data modification detection value received from the NRF with the NF profile data modification detection value computed for the NF profile stored locally by the first NF, determining that the first NF profile data modification detection value received from the NRF matches NF profile data modification detection value computed for the NF profile stored locally by the first NF, and, in response to determining that the first NF profile data modification detection value received from the NRF matches the NF profile data modification detection value computed for the NF profile stored locally by the first NF, refraining from sending an NF profile update to the NRF.

12. The system of claim 10 wherein the NF profiles update manager is configured to locate the NF profile for the first NF by performing a lookup in the NF profiles database maintained by the NRF using an NF instance ID received in the NF heart-beat request message from the first NF.

13. The system of claim 10 wherein the NF profile data modification detection value includes a checksum of the NF profile of the first NF located in the NF profiles database maintained by the NRF.

14. The system of claim 10 wherein the NF profiles update manager is configured to transmit the first NF profile data modification detection value to the first NF in a 204 No Content message.

15. The system of claim 10 wherein the second NF is configured to:
receive the second NF profile data modification detection value computed for the NF profile of the second NF;
compute an NF profile data modification detection value for an NF profile of the second NF stored locally by the second NF;
compare the second NF profile data modification detection value received from the NRF with the NF profile data modification detection value computed for the NF profile of the second NF stored locally by the second NF;
determine that the second NF profile data modification detection value computed for the second NF and received from the NRF does not match the NF profile data modification detection value computed for the NF profile stored locally by the second NF; and
in response to determining that the second NF profile data modification detection value computed for the NF profile of the second NF and received from the NRF does not match the NF profile data modification detection value computed for the NF profile stored locally by the second NF, send the NF update message to the NRF, wherein sending the NF update message to the NRF includes sending an NF update request message to the NRF.

16. The system of claim 10 comprising an intelligent NF profile update feature support database maintained by the NRF indicating whether NFs support intelligent NF profile updating.

17. The system of claim 16 wherein the NF profiles update manager is configured to, prior to computing the first NF profile data modification detection value, access the intelligent NF profile update feature support database and determine that the first NF supports intelligent NF profile updating.

18. A non-transitory computer readable media having stored thereon executable instructions that when executed by a processor of a computer control the computer to perform steps comprising:
at a network function (NF) repository function (NRF):
receiving, from a georedundant mate NRF and over a data replication channel between the NRF and the georedundant mate NRF, an NF profile update for a first NF that successfully updated its NF profile with the georedundant mate NRF;
after failure of the georedundant mate NRF:
receiving, from the first NF that previously communicated with the geo-redundant mate NRF as primary, an NF heart-beat request message;
receiving, from a second NF that previously communicated with the geo-redundant mate NRF as primary and that successfully updated its NF profile with the geo-redundant mate NRF but whose updated NF profile was not communicated to the NRF over the data replication channel, an NF heart-beat request message;
locating an NF profile for the first NF in an NF profiles database maintained by the NRF, computing an NF profile data modification detection value for the NF profile, and transmitting the NF profile data modification detection value to the first NF; and
locating an NF profile for the second NF in the NF profiles database maintained by the NRF, computing a second NF profile data modification detection value for the NF profile for the second NF, and transmitting the second NF profile data modification detection value to the second NF; and
receiving, from the second NF, an NF update message containing a full NF profile of the second NF.

\* \* \* \* \*

UNITED STATES PATENT AND TRADEMARK OFFICE
CERTIFICATE OF CORRECTION

PATENT NO. : 11,563,638 B1
APPLICATION NO. : 17/460149
DATED : January 24, 2023
INVENTOR(S) : Jayaramachar et al.

It is certified that error appears in the above-identified patent and that said Letters Patent is hereby corrected as shown below:

On the Title Page

Item (54), Line 6, after "FUNCTION" insert -- (NRF) --, therefor.

In the Specification

In Column 1, Line 6, after "FUNCTION" insert -- (NRF) --, therefor.

Signed and Sealed this
Nineteenth Day of December, 2023

Katherine Kelly Vidal
*Director of the United States Patent and Trademark Office*